March 21, 1967 H. B. DIAMANT 3,310,781

CODE TRANSLATOR CIRCUIT

Filed Dec. 3, 1962 8 Sheets-Sheet 1

INVENTOR.
HENRI B. DIAMANT
BY
Hopgood & Calimafde
ATTORNEYS

March 21, 1967 H. B. DIAMANT 3,310,781

CODE TRANSLATOR CIRCUIT

Filed Dec. 3, 1962 8 Sheets-Sheet 2

INVENTOR.
HENRI B. DIAMANT
BY Hopgood & Calimafde
ATTORNEYS

CODE TRANSLATOR CIRCUIT

Filed Dec. 3, 1962 8 Sheets-Sheet 3

INVENTOR.
HENRI B. DIAMANT

BY
Hopgood & Calimafde
ATTORNEYS

INVENTOR.
HENRI B. DIAMANT
BY Hopgood & Calimafde
ATTORNEYS

March 21, 1967 H. B. DIAMANT 3,310,781
CODE TRANSLATOR CIRCUIT
Filed Dec. 3, 1962 8 Sheets-Sheet 5

INVENTOR.
HENRI B. DIAMANT
BY
Hopgood & Calimafde
ATTORNEYS

March 21, 1967 H. B. DIAMANT 3,310,781

CODE TRANSLATOR CIRCUIT

Filed Dec. 3, 1962 8 Sheets-Sheet 6

INVENTOR.
HENRI B. DIAMANT

BY Hopgood & Calimafde

ATTORNEYS

March 21, 1967 H. B. DIAMANT 3,310,781

CODE TRANSLATOR CIRCUIT

Filed Dec. 3, 1962 8 Sheets-Sheet 7

INVENTOR.
HENRI B. DIAMANT
BY Hopgood & Calimafde
ATTORNEYS

INVENTOR.
HENRI B. DIAMANT
BY
Hopgood & Calimafde
ATTORNEYS 3,310,781
CODE TRANSLATOR CIRCUIT
Henri B. Diamant, State College, Pa., assignor to HRB-Singer, Inc., State College, Pa., a corporation of Delaware
Filed Dec. 3, 1962, Ser. No. 241,680
16 Claims. (Cl. 340—172.5)

This invention relates to a code translator circuit for translating parallel-serial coded information into serial-parallel coded information. The invention can be used in many different computer applications, but it is particularly useful in punched tape readers for accounting machines, which will serve as a concrete example of the invention in this document.

Accounting machines usually receive their input information from punched cards which contain serial-parallel coded information, i.e. information in which the individual units of information are represented in a serial code while the composite message is represented in a parallel code. In many cases, however, it is necessary to derive the accounting machine input information from punched tape. In these cases, a serious complication arises from the fact that punched tape contains parallel-serial coded information, i.e. information in which the individual units of information are represented in a parallel code while the composite message is represented in a serial code. This complication can be better appreciated by an examination of FIGS. 1A, 1B, 2A, and 2B of the attached drawings, which show an illustrative input message as recorded on a punched card and a punched tape.

The composite message shown in FIGS. 1A and 2A comprises a sales transaction record which includes a 4 digit department number, a 4 digit salesman number, a 4 digit item number, and a 6 digit cost number. On the punched card, the individual digits are represented by a single hole punched in one of 10 horizontal rows on the card. The composite message is represented by a parallel series of vertical columns each of which contains a punched hole representing the corresponding digit. As shown in FIG. 1A, columns 1 through 4 of the card contain the department number, columns 5 through 8 contain the salesman number, columns 9 through 12 contain the item number, and columns 13 through 18 contain the cost number. The information stored on the card is read off by passing the card under a set of card reader brushes which contain an individual electrical brush for each column of the card, as illustrated in FIG. 1B. Each brush produces an electrical pulse output when the corresponding punched hole passes under it, and the digit represented by each hole is determined by the time at which the corresponding pulse appears in the card reading cycle.

On the punched tape, however, the individual digits are represented by a plurality of holes rather than a single hole. In the example shown in FIG. 2A, holes are punched in one or more of four possible positions (tracks 1 to 4) in accordance with a predetermined parallel code to represent the individual digits. The code employed might, for example, be the well known binary-coded decimal code, which is particularly well suited for computer input information. The digits are read off the tape by a set of tape reader photocells (FIGS. 2A and 2B) which simultaneously scan each track of the tape and develop output pulses corresponding to the holes punched in the tape. The individual digits are arranged in parallel columns on the tape, as they are on the punched card, but since the tape is read digit by digit in time sequence, the composite message is read off the tape in serial fashion.

The difference between the serial-parallel code of the punched card and the parallel-serial code of the punched tape can be better appreciated from the waveforms of FIGS. 3A and 3B, which show characteristic output pulses from a punched tape reader and a punched card reader respectively. The punched tape reader output comprises a time sequence of output pulses from each of the photocells therein. A feed track pulse occurs at every position of the sequence, and pulses occur at the remaining tracks in accordance with the code employed on the punched tape. Each individual digit is represented by a set of pulses which occur simultaneously, i.e. in parallel, while the composite message is represented by a series of pulse sets which occur in time sequence, i.e. in serial order.

In the output of the punched card reader, however, the individual digits are represented by a serial code which is timed by a series of ten digit pulses (FIG. 3B). The digit pulses are generated by the punched card reader whenever a card passes under the card-reader brushes thereof. Each digit pulse is synchronized with the passage of the card reader brushes over a corresponding one of the ten digit rows of the card. Therefore, the digit signified by the output pulse of each card reader brush can be determined by its time of occurrence with respect to the digit pulses. In the example shown in FIG. 3B, the output pulse from card reader brush #1 occurs in synchronism with the fifth digit pulse, thereby signifying the digit 5. The composite message, which comprises all of the digits punched on the card, is read off in the same time interval by the other card reader brushes. Thus the individual digits of the punched card are represented by a time-dependent code, i.e. a serial code, while the composite message is represented by a set of pulses which occur in the same time interval, i.e. in parallel. The "10 pulse" and "all cycles" pulses shown in FIG. 3B are timing signals generated in the punched card reader. They are used to set up the accounting machine circuits to receive input information.

The waveforms of FIGS. 3A and 3B illustrate quite clearly that parallel-serial coded information cannot be applied directly to computers which are adapted to receive serial-parallel coded inputs. In the past, when it was necessary to derive the inputs for an accounting machine from punched tape, this difficulty was overcome by preparing a set of punched cards which duplicated the information stored on the tape, and then using the punched cards to generate input signals for the accounting machine. It is, however, quite expensive and time consuming to prepare a set of punched cards for information which is already stored in reproducible form on punched tape, particularly if the information is only going to be used for one accounting machine operation. Therefore, it is highly desirable to have a code translator circuit which is adapted to translate the punched tape signals into serial-parallel coded signals which can be applied directly to the input of an accounting machine.

Accordingly, one object of this invention is to provide a code translator circuit for translating parallel-serial coded information into serial-parallel coded information.

Another object of this invention is to provide a code translator circuit of the above described type which is simpler and more reliable than those heretofore known in the art.

A further object of this invention is to provide a code translator circuit of the above described type which is more accurate than those heretofore known in the art.

An additional object of this invention is to provide an improved punched tape reader for accounting machines or the like.

Other objects and advantages of the invention will be apparent to those skilled in the art from the following description of several specific embodiments of the invention, as illustrated in the attached drawings, in which.

Figure 3A:
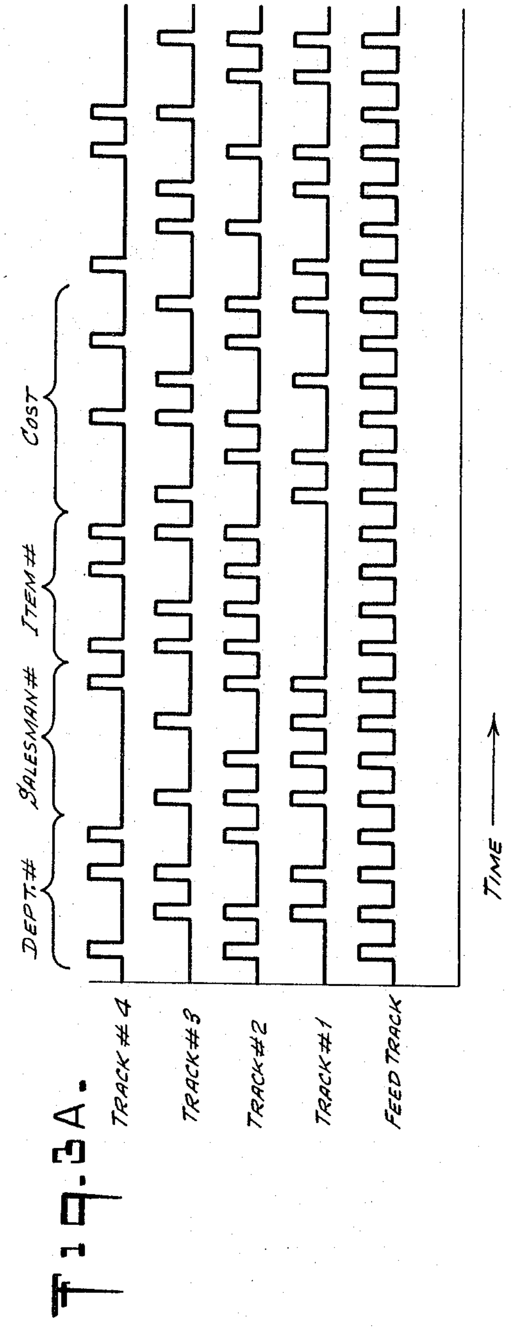
FIG. 3A is a set of waveforms showing the ouput signals from a punched tape reader such as illustrated in FIGS. 2A and 2B.
Figure 3B:
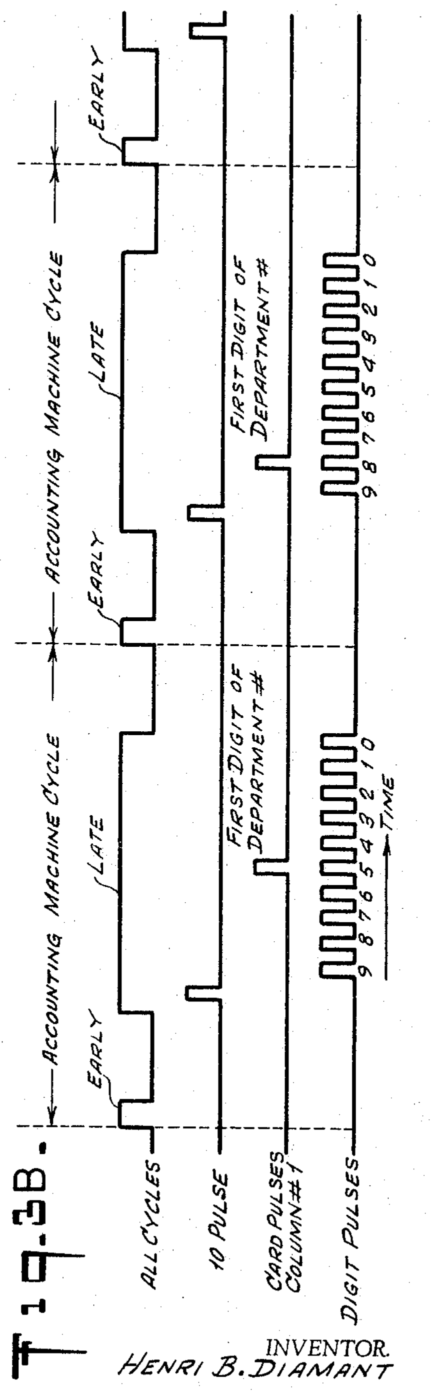
FIG. 3B is a set of waveforms showing the output signals from a punched card reader such as illustrated in FIGS. 1A and 1B.

The fundamental purpose of this invention is to translate parallel-serial coded signals such as illustrated in FIG. 3A into serial-parallel coded signals such as illustrated in FIG. 3B. In general terms, this is accomplished by (A) generating the parallel-serial coded input signals for an input time period corresponding to a complete input message, (B) storing each unit of the parallel-serial coded message in a corresponding one of a set of storage registers, and (C) simultaneously translating the contents of the storage registers into serial coded output signals at the end of the input time period. In the preferred embodiment of the invention, the storage registers are binary counter circuits which perform the dual function of storing the parallel coded input signals and translating them into serial coded input signals. This will be better understood with reference to the circuit of FIG. 4A, which is adapted to perform the above noted functions with a five track punched tape whose input messages are divided into repeated blocks of information each containing the same number of units, e.g. a sequence of sales transactions such as illustrated in FIG. 3A.

Figure 4A:
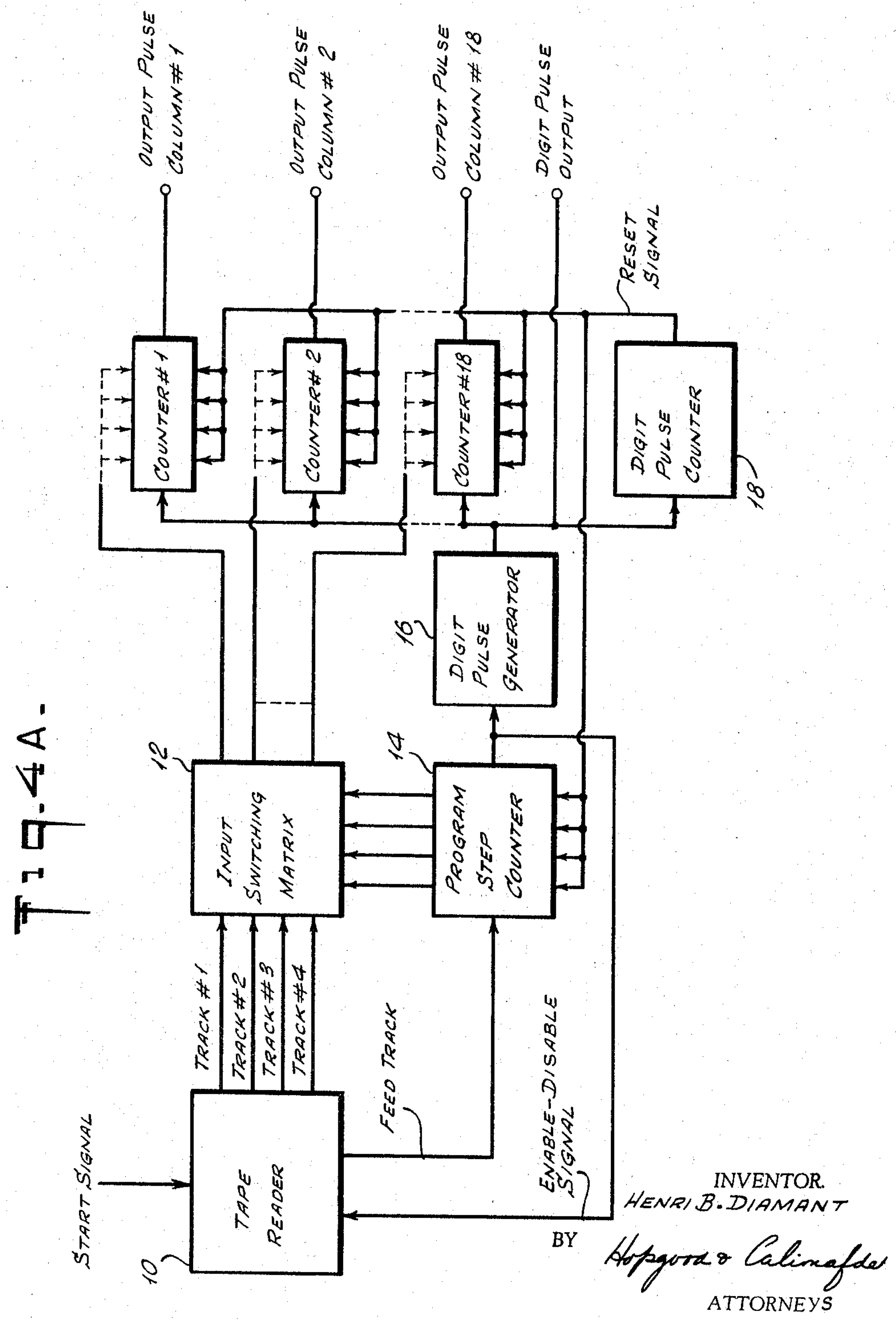
FIG. 4A is a block diagram of one illustrative embodiment of this invention.

Referring to FIG. 4A, this embodiment of the invention contains a prior art tape reader 10 which is adapted to start running in response to a "start" input signal, to stop running in response to a "disable" input signal, and to resume running in response to an "enable" input signal. Tape reader 10 can be any suitable prior art tape reader, and the "start" input signal can be a manual switch, or a bistable voltage level, or any other suitable signal.

When the tape reader is started, it produces a series of parallel coded output pulses such as illustrated in FIG. 3A. The output pulses from tape reader tracks 1 through 4 (the information bearing tracks) are applied to an input switching matrix 12 which is controlled by a program step counter 14. Input switching matrix 12 routes each unit of input information to a different one of a plurality of counters. In this particular example the input message contains 18 digits; therefore 18 counter circuits are provided, one for each input digit. The first set of input pulses, which represent the first digit of the input message, are applied to counter circuit #1. The next set of input pulses are applied to counter #2, and so on. This input stepping action is accomplished by program step counter 14, which advances by one step in its count for each feed track input pulse. Taken together, input switching matrix 12 and program counter 14 are the equivalent of a stepping switch. It is, however, preferable to use a diode switching matrix and binary counter circuit instead of a stepping switch because the switching matrix-counter combination is much faster and more reliable.

Program step counter 14 is adapted to generate an enable-disable signal when it reaches the end of its count, i.e. when it switches the input information to last counter of the series. This enable-disable signal is preferably a switchable voltage level which changes when the counter reaches the end of its count and which reverts to its original state when the counter is reset to zero. A signal of this type can be easily generated by a simple AND circuit, as will be readily understood by those skilled in the art. The enable-disable signal performs two functions in this embodiment of the invention. It stops tape reader 10 and starts a digit pulse generator 16, which is used to simultaneously translate the contents of counters #1 through #18 into serial coded signals, as will be explained in detail below.

In order to translate the parallel coded input signals into serial coded output signals, counters #1 through #18 must be adapted to count in accordance with a predetermined parallel code which matches the code of the information applied thereto. For sake of simplicity, this particular embodiment is adapted to count in a binary coded decimal (BCD) input code, which directly matches the code used on the punched tape. Therefore, each set of input pulses from the tape reader will set the corresponding counter to the equivalent BCD state of its counting sequence. The length of the counting sequence is set to correspond to the desired output code, which in this case is a decimal code. In other words, the counters in this embodiment are adapted to step through a count of 10 in response to input pulses from digit pulse generator 16 and to produce an output pulse on the last step of its counting cycle. In addition each counter is adapted to be set to a predetermined step in its count by the input signals applied thereto from input switching matrix 12. For example, if the first digit recorded on the punched tape is a 5, the binary coded decimal equivalent of 5 will be applied to the individual stages of counter #1, which will set counter #1 to the fifth step of its counting sequence. Therefore, counter #1 will produce an output pulse after it receives 5 input pulses from digit pulse generator 16. In the same manner, counter #2 will be preset by the tape reader output pulses to the second digit of the input message, counter #3 will be preset to the third digit of the input message, and so on. Therefore, when digit pulse generator 16 starts applying input pulses to counters #1 through 18, each counter will produce an output pulse at a time corresponding to its respective digit of the input message, thereby converting the parallel coded numbers of the input message to serial coded numbers. The output of digit pulse generator 16 is also applied to a digit pulse counter 18 which is adapted to end the output cycle of the circuit after 10 digit pulses have been generated. The output signal of digit pulse counted 18 resets program step counter 14, which disables digit pulse generator 16 and enables tape reader 10. The output of digit pulse counter 18 also resets counters #1 through #18 to zero in preparation for the next input cycle.

Figure 4B:
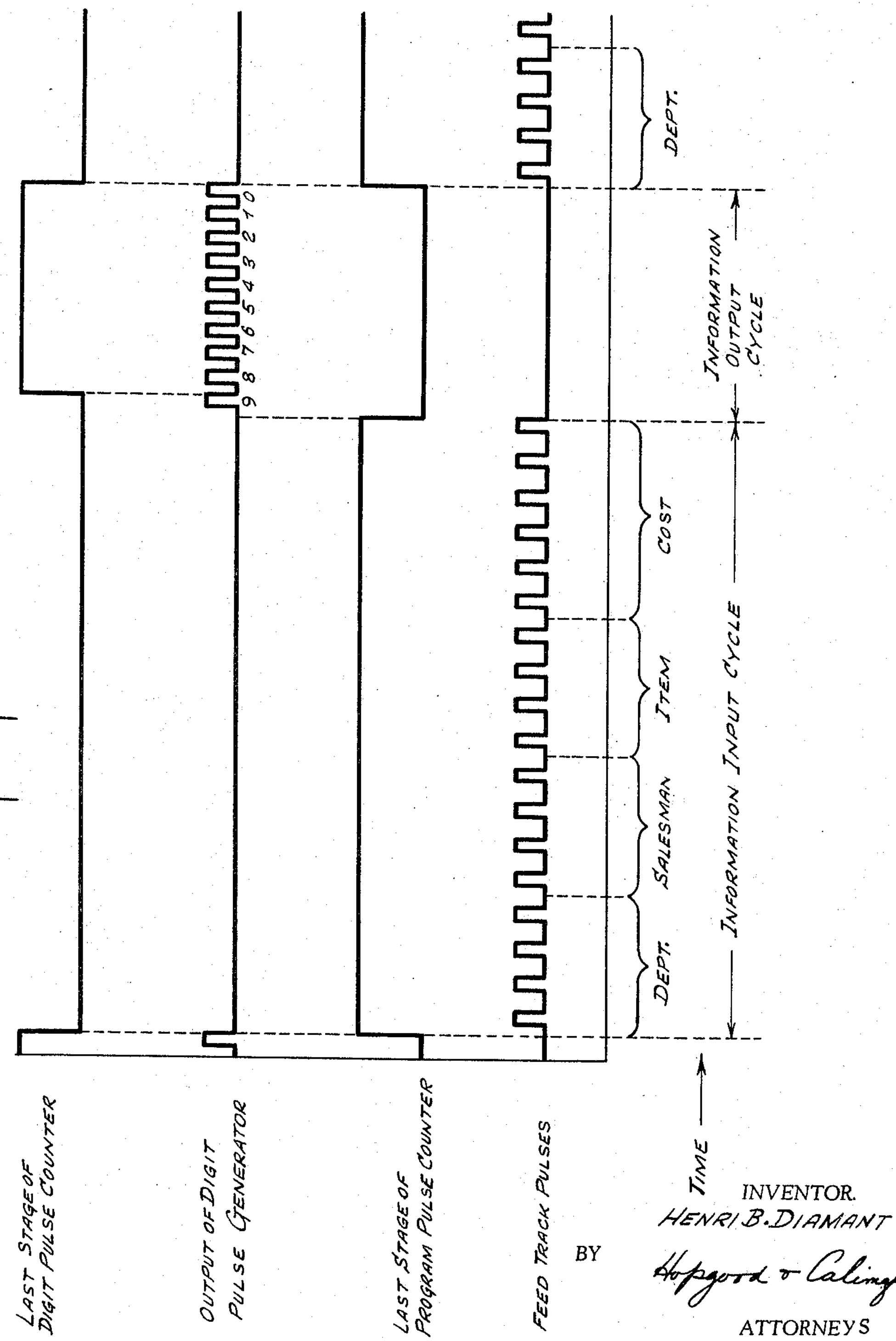
FIG. 4B is a set of waveform illustrating the operation of the embodiment disclosed in FIG. 4A.

The above described operating cycles are illustrated in the waveforms of FIG. 4B, which show an information input cycle in which the input digits are stored in the counter circuits, and an information output cycle in which the numbers stored in the counters are simultaneously converted into serial coded numbers. In this particular embodiment, the information input cycle ends after each 18 feed track pulses, but it will be understood by those skilled in the art that the information input cycle could extend for any desired number of track pulses, and also that the information input does not necessarily have to be a fixed number of track pulses. By providing a "start message" signal at the beginning of each message, and an "end of message" signal at the end, it is possible to read messages of variable length from the same tape. The information output cycle of this particular embodiment contains ten digit pulses, but it could contain more or less in cases where a non-decimal serial output code is desired.

Figure 1A:
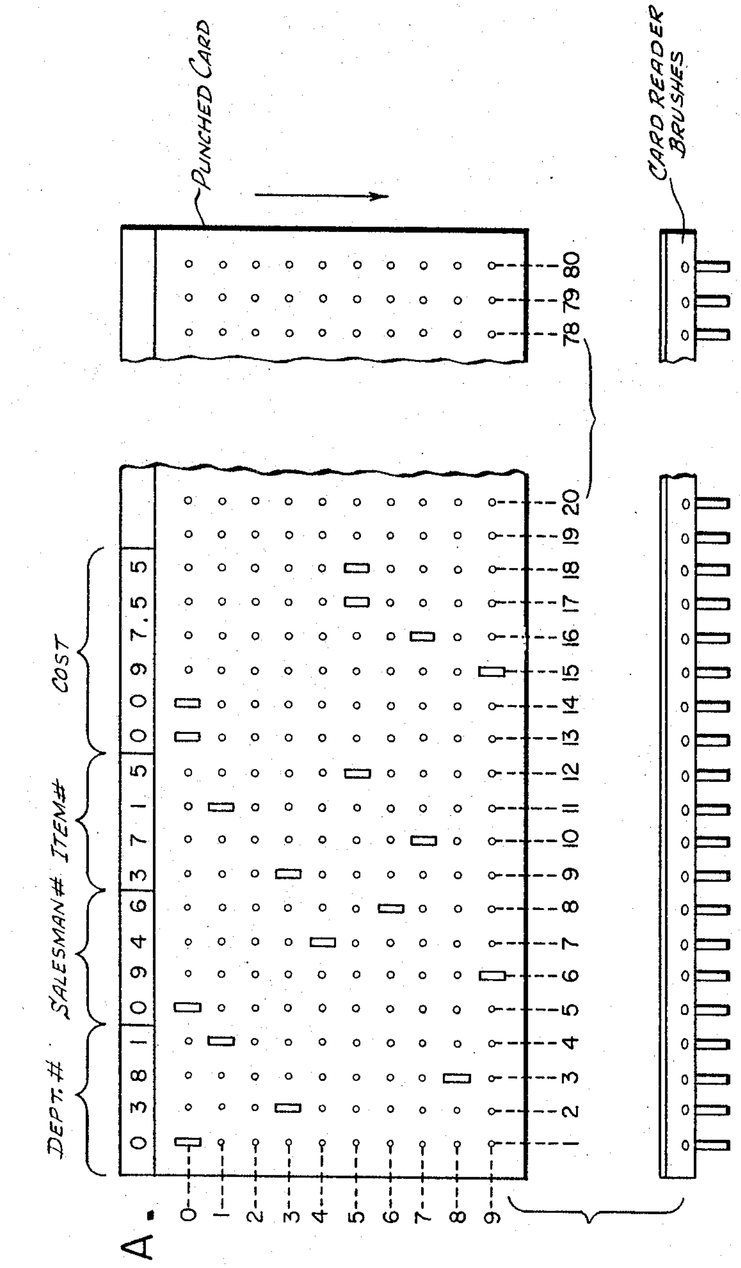
FIG. 1A is a plan view of a prior art punched card and a set of prior art card reader brushes.
Figure 1B:
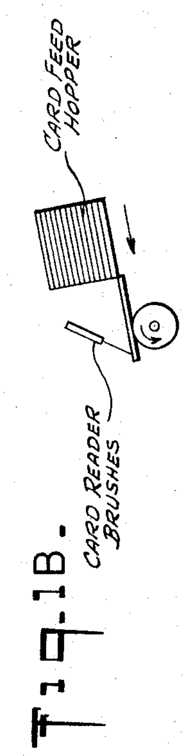
FIG. 1B is a schematic elevation view of a prior art punched card reader.
Figure 2A:
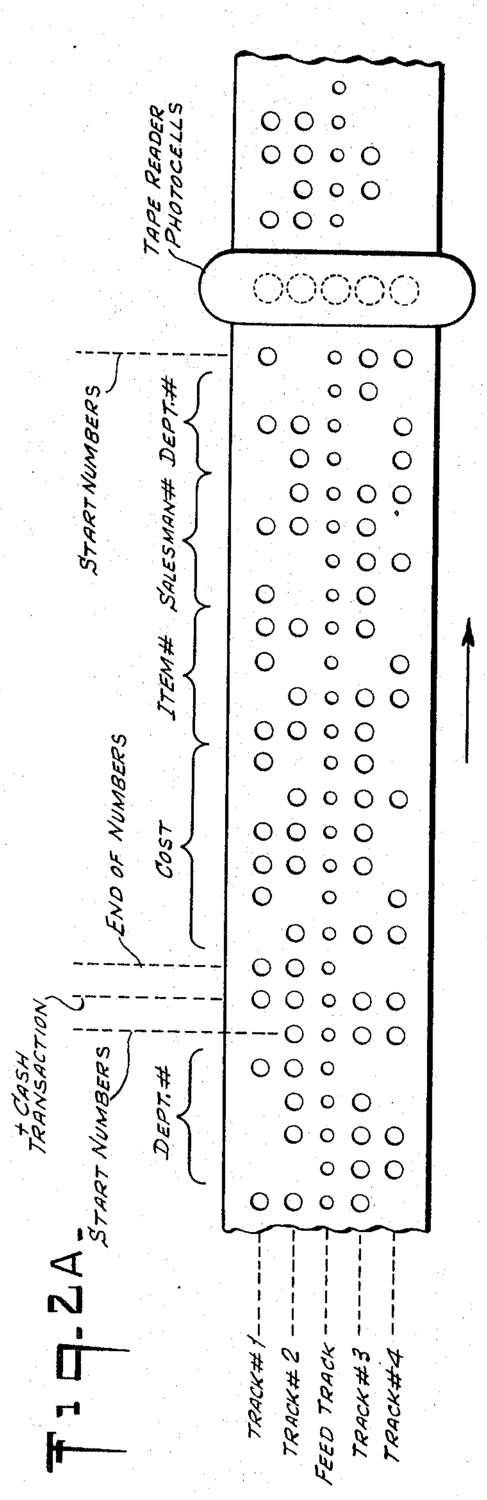
FIG. 2A is a plan view of a prior art punched tape and a set of prior art tape reader photocells.
Figure 2B:
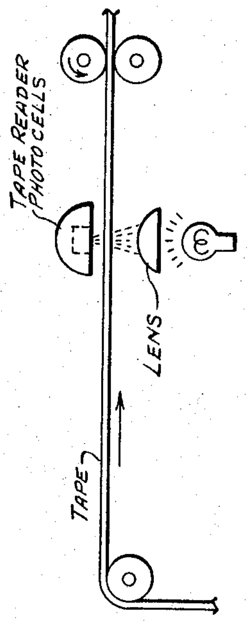
FIG. 2B is a schematic elevation view of a prior art punched tape reader.
Figure 5:
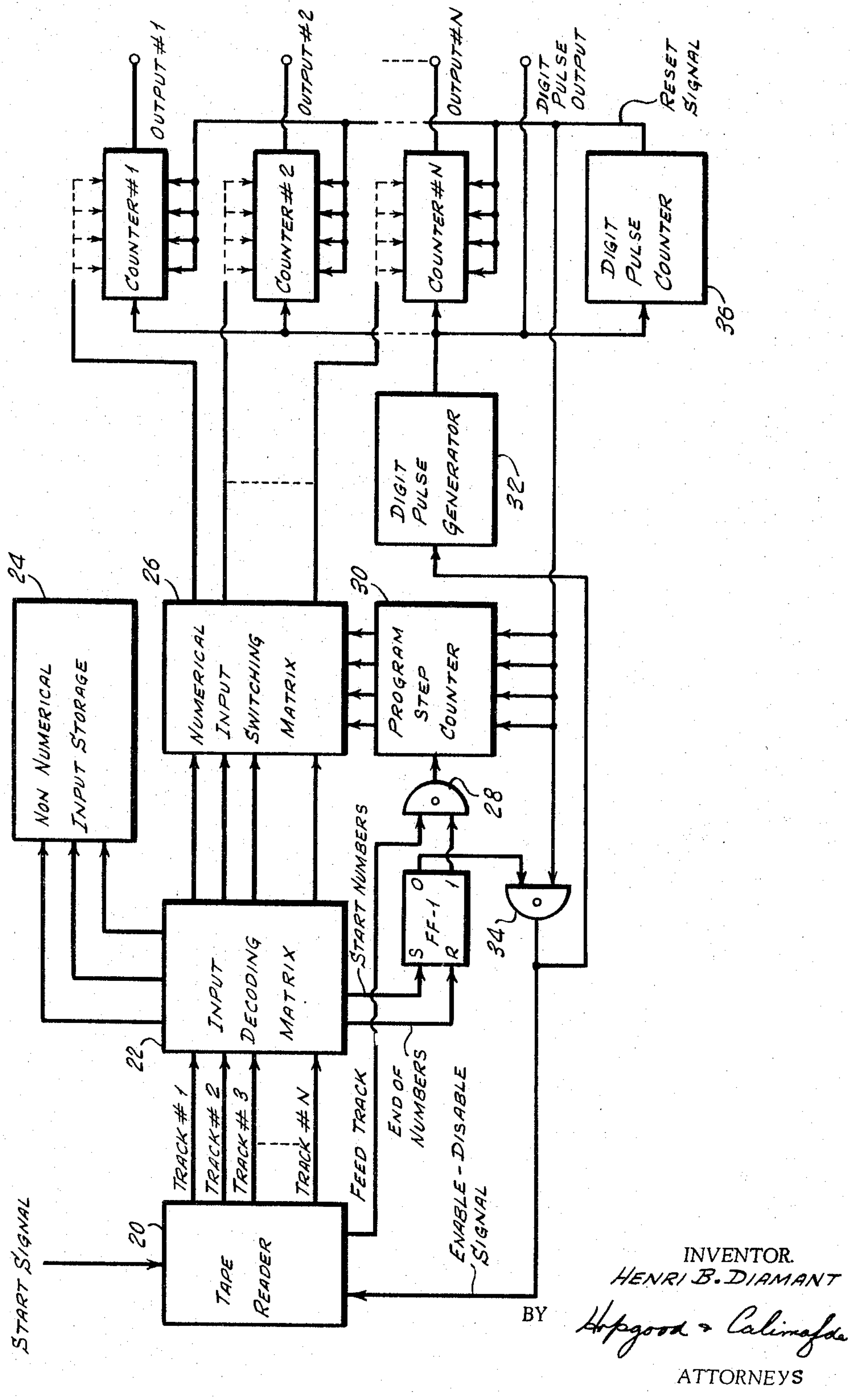
FIG. 5 is a block diagram of a second embodiment of the invention.

FIG. 5 shows a more sophisticated embodiment of the invention which is adapted to receive input messages of variable length containing both numerical and non-numerical information. In this embodiment, the tape is read by an N track tape reader 20, which starts its operation in response to a "start" input signal. The output from tracks #1 through #N of the tape reader are applied to an input decoding matrix 22, which separates the numerical information from the non-numerical information and applies the non-numerical information to a separate storage means 24 and the numerical information to a switching matrix 26. The non-numerical information might, for example, comprise signals indicating either a negative or a positive cash transaction, such as illustrated in FIG. 2A, and storage means 24 might comprise flip-flop or magnetic storage elements adapted to store this information. On the punched tape, the non-numerical information is arranged to precede the numerical information, which is also preceded by a "start numbers" signal. When the "start numbers" signal is detected by decoding matrix 22, it is applied to the set input terminal of flip-flop FF–1, which enables an AND gate 28 and allows feed track pulses to be applied to the input of a program step counter 30. The program step counter switches the numerical input information in sequence to a plurality of counters #1 through #N as in the previously described embodiment. In this circuit, however, the numerical information is represented on the punched tape in an N unit code rather than a BCD code, and therefore decoding matrix 22 must be adapted to change the numerical input information into BCD coded inputs for switching matrix 26. At the end of the numerical input, an "end of numbers" input signal is applied to the reset input terminal of flip-flop FF–1, which disables AND gate 28 and at the same time disables tape reader 20 and enables digit pulse generator 32 by way of AND gate 34. This ends the information input cycle and begins the information output cycle, which is timed by a digit pulse counter 36. The information output cycle of this embodiment is the same as described previously in connection with the embodiment of FIG. 4A. At the end of the information output cycle, the counters are reset by an output pulse from digit pulse counter 36, digit pulse generator 32 is disabled via AND gate 34, and tape reader 20 is enabled via AND gate 34 to start another information input cycle. It should be noted that the foregoing information input cycle can contain any desired amount of numerical and non-numerical information, since the input sequence is timed by a "start numbers" and "end of numbers" code punched in the tape. It is not necessary to have a start signal for the non-numerical information, since any input signals which arrive in the time interval between a "start numbers" signal and an "end of numbers" signal are non-numerical. In addition, the non-numerical information can be distinguished from the numerical information by the code employed.

Figure 6B:
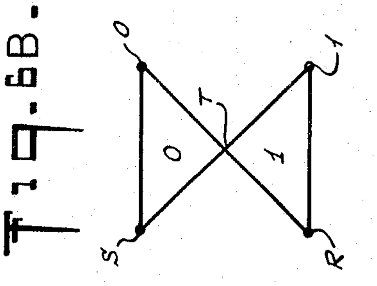
FIG. 6B is a block diagram symbol used to represent the flip-flop circuit of FIG. 6A.
Figure 7:
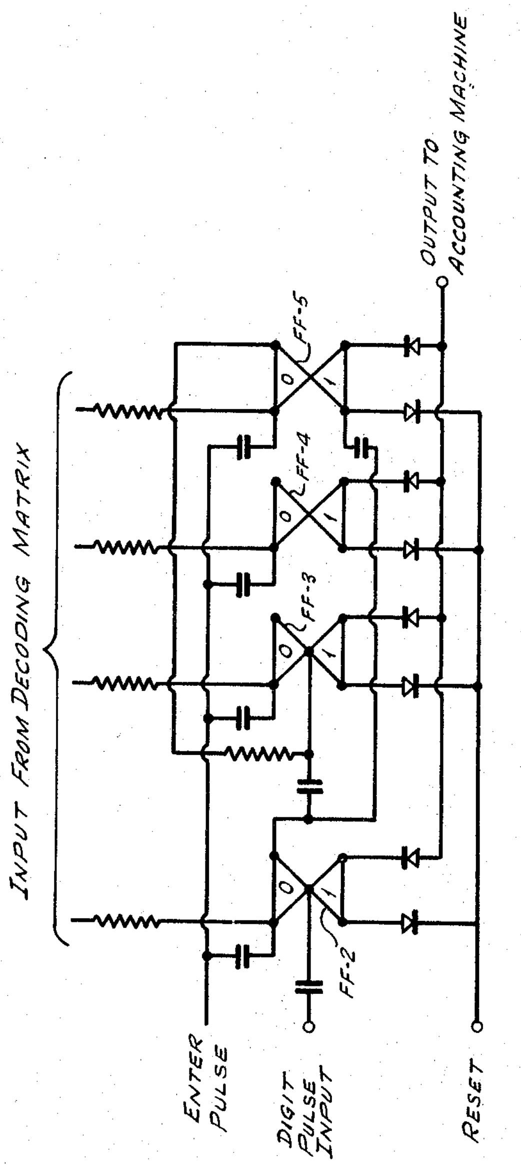
FIG. 7 is a schematic circuit diagram of one suitable counter circuit which can be used in the code translator of this invention.
Figure 6A:
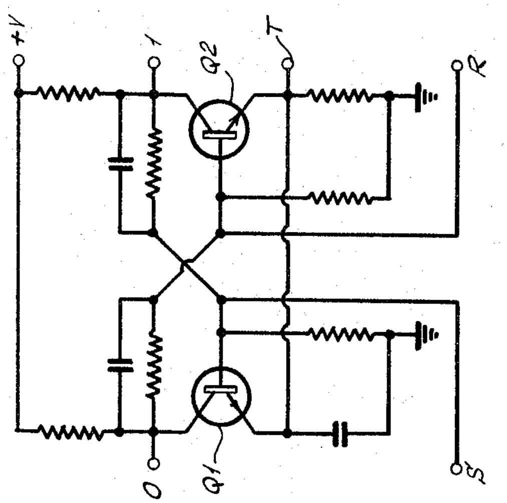
FIG. 6A is a schematic circuit diagram of one suitable flip-flop which can be used in the code translator of this invention.

FIGS. 6A, 6B and 7 show exemplary flip-flop and counter circuits which can be used to mechanize the foregoing embodiments of the invention.

FIG. 6A shows a flip-flop circuit comprising transistors Q1 and Q2 which are cross-coupled in a conventional manner. This flip-flop circuit contains a "set" input terminal (S), a "reset" input terminal (R), a "trigger" input terminal (T), and two complementary output terminals "1" and "0." The operation of this circuit will be apparent to those skilled in the art without further explanation. FIG. 6B is a block diagram symbol which represents the circuit of FIG. 6A. The corners and center of this block diagram symbol represent the input and output terminals of the flip-flop circuit as indicated in FIG. 6B.

FIG. 7 shows a counter circuit containing four flip-flops FF–2 . . . FF–5 which are coupled together so as to form a decade counter which counts in accordance with a BCD code. The counter is reset to zero by a negative pulse applied to the reset input terminal of each flip-flop through a corresponding input diode. After being reset to zero, the counter will advance by one step in its 10 step counting cycle for each pulse applied to the digit pulse input terminal. At each step of the counting cycle, the flip-flops assume states which represent the BCD equivalent of the step number. On the tenth input pulse, an output signal is generated through an AND gate which comprises four diodes coupled in parallel to the "1" output terminal of each flip-flop. As thus far described, this circuit is a conventional decade counter. It is, however, modified to receive parallel input information on the set (S) input terminal of each flip-flop, as explained below.

An input resistor and input capacitor are coupled to the set (S) input terminal of each flip-flop. The input capacitors are coupled in parallel to an "enter pulse" terminal which receives a negative input pulse having an amplitude of —V volts. Each of the input resistors are coupled to a corresponding parallel code input voltage, which is either +V volts or ground. +V volts in this example signifies a binary 0 and ground signifies a binary 1. The pattern of input voltages applied to the input resistors represents a parallel coded number in binary form. Thus the binary number 1010 would be represented as follows on the input resistors, reading from left to right on FIG. 7: ground, +V, ground, +V. Under these input conditions, the negative "enter pulse" of —V will be cancelled out on flip-flops FF–3 and FF–5, which means that FF–3 and FF–5 will remain in the binary zero (reset) state when the "enter pulse" is applied, while FF–2 and FF–4 will be triggered to the binary one (set) state. The resulting state of the counter will thus be equivalent to the parallel binary number applied to the input resistors, which means that the counter will be preset to the step number corresponding to the decimal equivalent of the binary input number. Therefore, the counter output pulse will be generated on the $(10-N)th$ pulse applied to the digit pulse input terminal. This transforms the parallel binary number input to serial decimal number output. It should be noted that this counter circuit performs the dual functions of storing the parallel coded input number and transforming it into a serial coded output number. A dual function counter circuit is not essential to the invention, but it is preferable.

Figure 8:
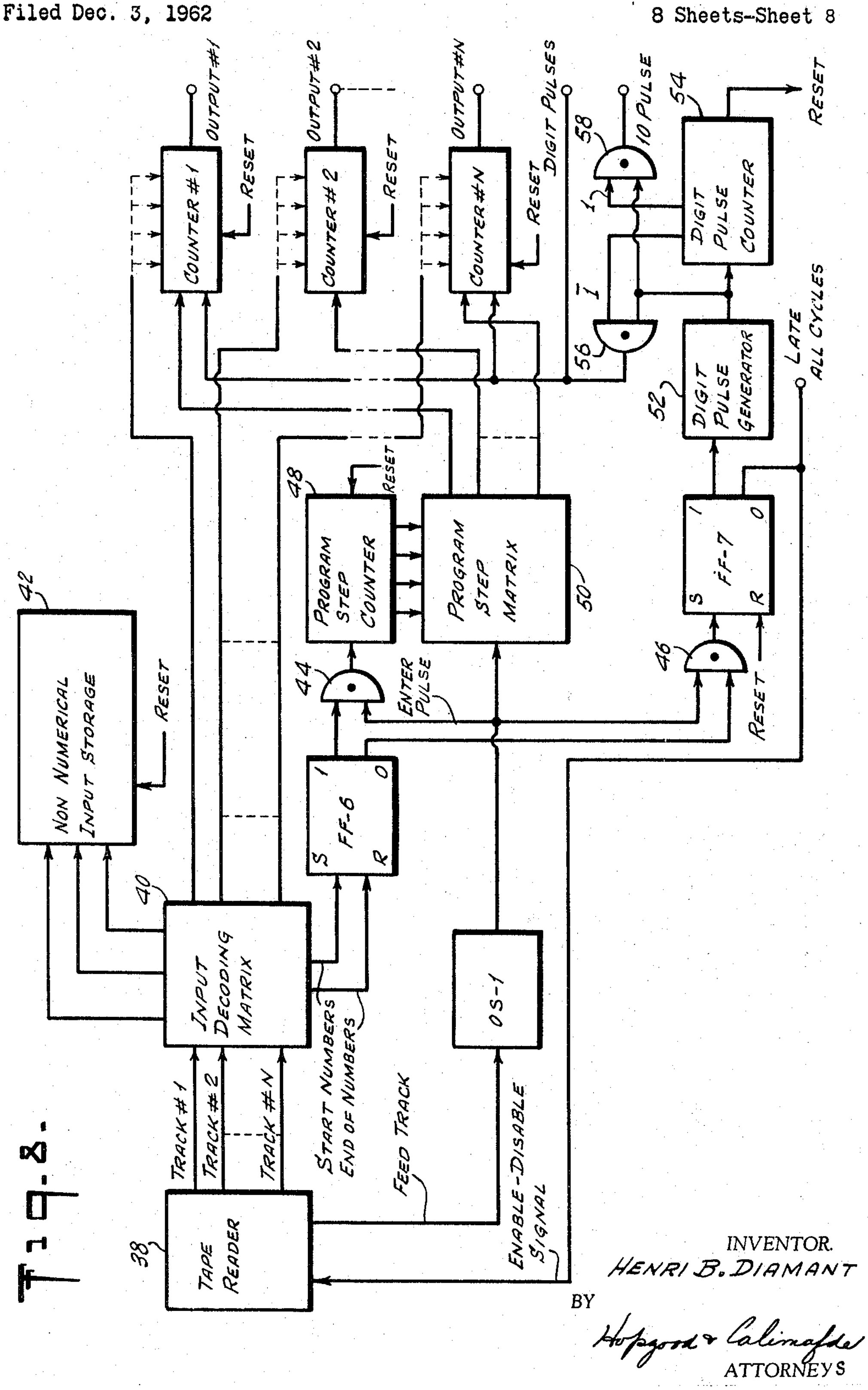
FIG. 8 is a block diagram of a third embodiment of the invention.

With a counter circuit as described above, it is not necessary to switch the tape reader output signals from one counter to the next as was the case in the embodiments of FIGS. 4A and 5. Instead, the tape reader output can be simultaneously applied to all of the counters and the "enter" pulses can be switched from counter to counter. FIG. 8 shows an embodiment which is adapted to operate in this manner. Referring to FIG. 8, the code track output of tape reader 38 is applied to input decoding martix 40, which separates the numerical input information from the non-numerical information and which re-codes the numerical information into a BCD code. The non-numerical input information is applied to storage means 42, with the exception of the "start numbers" and "end of numbers" signals, which are applied to flip-flop FF–6. The BCD coded numerical information is simultaneously applied in parallel to counters #1 through #N, which each comprise a circuit such as disclosed in FIG. 7. The input information, of course, is applied to the input resistors which are marked "input from decoding matrix" in FIG. 7.

Before the numerical input information is applied to the counters, however, the "start numbers" signal is applied to the set input terminal of FF–6, which enables AND gate 44 and disables AND gate 46. Feed track pulses are then applied to program counter 48 via gate 44. The feed track pulses, which are amplified by a single shot multivibrator OS–1, are also applied to a program step matrix, which switches the feed track pulses in sequence down a plurality of output conductors in accordance with the state of program step counter 48. The output conductors of program step matrix 50 are each coupled to the "enter pulse" input of a corresponding counter (see FIG. 7). Therefore, the feed track pulse will be applied to each counter in turn, and the binary input information will be entered in sequence into the counter circuits. When the last input digit has been received, FF–6 is reset by the "end of numbers" signal, thereby disabling AND gate 44 and enabling AND gate 46. The feed track pulse which accompanies the "end of numbers" signal sets flip-flop FF–7 via AND gate 46, which enables digit pulse generator 52 and starts the information output cycle. In this particular embodiment of the invention, the information output circuits have been modified so as to produce an "all cycles" output signal and a "10 pulse" such as indicated in the waveforms of FIG. 3B. A "late all cycles" pulse is generated by the 0 output of flip-flop FF–7, which also serves to disable tape reader 38 during the information output cycle. A "10 pulse" output signal is generated by an AND gate 52 which passes the first digit pulse to a "10 pulse" output terminal and blocks all succeeding pulses. AND gate 52 receives a "1" signal from digit pulse counter 54. This "1" signal enables gate 52 when the counter is in its initial state. After the first digit pulse has been applied to the digit pulse counter, the "1" signal goes off and an "$\bar{1}$" signal goes on, which enables AND gate 56 and routes the remaining digit pulses to the cuonter circuits. It will be apparent that the digit pulse counter must be adapted to count to eleven rather than 10, since it counts the "ten pulse" plus ten "digit pulses." When digit pulse counter 54 reaches the end of its count, it develops a "reset" output signal which resets all of the resettable circuit elements and initiates another information input cycle.

In mechanizing the above described embodiments of the invention, any suitable prior art logic circuits can be employed, provided that they perform the indicated functions. For example, the program step counters and digit pulse counters can comprise flip-flop counter circuits such as disclosed in FIG. 7, with appropriate modifications to achieve the desired counting sequence. The required modifications will be apparent to those skilled in the art. The "1" and "$\bar{1}$" outputs from digit pulse counter 54 (FIG. 8) can be derived by a diode AND gate and a diode OR gate coupled to each flip-flop in the counter. The diode AND gate would be connected to produce a "1" output signal when the code signifying the first step of the counting sequence was present in the counter flip-flops, and the diode OR gate would be connected to produce an "$\bar{1}$" output signal when any other code was present. The program step matrix and numerical input switching matrix can be any suitable diode or transistor switching matrix, many of which are known in the art. And the input decoding matrix can also be any suitable diode or transistor matrix. The digit pulse generators can be free running multivibrators or any other periodic pulse generator circuit.

From the foregoing description it will be apparent that this invention provides an improved code translator circuit for translating parallel-serial coded information into serial-parallel coded information. It will also be apparent that this invention provides an improved punched tape reader for accounting machines or the like. And it should be understood that this invention is by no means limited to the specific embodiments disclosed herein, since many modifications can be made in the disclosed structure without departing from the basic teaching of this invention. For example, it is not necessary to use a punched tape reader in this invention, any suitable source of aparallel-serial coded input signals can be employed. Furthermore, it is not necessary to generate decimal coded output signals such as disclosed herein. Any suitable serial-parallel output code can be employed to meet the requirements of other types of computer circuits. In addition, the circuit units disclosed herein can be replaced by many equivalent circuit units, and the particular circuit configurations disclosed herein can be modified in many ways. For example, the program step counter-switching matrix combination can be replaced by a stepping switch if desired, and the digit pulse counter could be a counting tube instead of a flip-flop counter. These and many other modifications of the invention will be apparent to those skilled in the art, and this invention includes all modifications falling within the scope of the following claims.

I claim:

1. A code translator circuit for translating parallel-serial coded signals into serial-parallel coded signals, said code translator circuit comprising input means for receiving parallel-serial coded signals, storage means for storing said parallel-serial coded signals in a plurality of storage circuits, and translation means for simultaneously translating the contents of said storage means into serial-parallel coded signals.

2. The combination defined in claim 1 in which said parallel-serial coded signals comprise a time sequence of parallel coded signal units, each of said signal units comprising a plurality of signals which occur simultaneously; and wherein said storage means comprises a plurality of storage registers each adapted to receive and to store one of said signal units, and means for applying each signal unit to a corresponding one of said storage registers; and wherein said translation means comprises means for simultaneously translating the contents of each of said storage registers into a serial coded signal.

3. The combination defined in claim 2 in which said storage registers each comprise counter-storage registers which are adapted to count in accordance with a predetermined counting cycle, said counter-storage registers being responsive to said signal units applied thereto and being operable to switch to the step of said counting cycle which corresponds to the signal unit applied thereto; and wherein said translation means comprises means for applying a train for input pulses to said counter-storage registers, and means for generating an output signal from each of said counter-storage registers at a predetermined step of said counting cycle.

4. The combination defined in claim 3 and also including decoding means coupled between said input means and said storage means, said decoding means being operable to translate said parallel coded signal units from a first parallel code into a second parallel code.

5. A code translator circuit for translating parallel-serial coded signals into serial-parallel coded signals, said code translator comprising means for generating parallel-serial coded signals for a time period corresponding to a message unit, said parallel-serial coded signals comprising a time sequence of parallel coded signal units, and each of said signal units comprising a plurality of signals which occur simultaneously; a plurality of storage means equal in number to the number of signal units generated in said time period corresponding to said message unit; means for storing each of said signal units in a corresponding one of said storage means; and translation means for simultaneously translating the contents of each of said storage means into serial coded signal units.

6. The combination defined in claim 5 in which said storage means each comprise counter-storage registers which are adapted to count in accordance with a predetermined counting cycle, said counter-storage registers being responsive to said signal units applied thereto and being operable to switch to the step of said counting cycle which corresponds to the signal unit applied thereto; and wherein said translation means comprises means for applying a train of input pulses to said counter-storage registers, and means for generating an output signal from each of said counter-storage registers at a predetermined step of said counting cycle.

7. The combination defined in claim 6 and also including means for terminating said parallel-serial coded signals after said time period corresponding to a message unit, means for initiating said train for input pulses to said counter-storage registers in a second time period following said first mentioned time period, means for terminating said train of input pulses when a predetermined number of pulses have been generated, and means reinitiating said parallel-serial coded signals after said second time period.

8. A punched tape translator circuit for translating parallel-serial coded signals into serial-parallel coded signals, said translator circuit comprising punched tape reader means operable to produce parallel-serial coded signals, a plurality of storage means coupled to said tape reader, input switching means for applying said signals to said storage means in time sequence, and translation means for simultaneously translating the contents of said storage means into serial coded signals.

9. The combination defined in claim 8 wherein each of said storage means comprises a counter-storage register circuit adapted to count in accordance with a predetermined code, said counter-storage register circuits being adapted to receive parallel input signals and to be preset to a corresponding step of said counting cycle by said parallel input signals, said counter-storage register circuits being adapted to receive a train of input pulses and to produce an output signal at the end of said counting cycle, and wherein said translation means comprises means for applying a train of pulses to said counter-storage register circuits.

10. The combination defined in claim 9 wherein said input switching means comprises a switching matrix coupled between said tape reader and said counter-storage register circuits and a switching counter circuit coupled between said switch matrix and said tape reader.

11. The combination defined in claim 10 and also including decoding means coupled between said counter-storage registers and said tape reader, said decoding means being operable to translate said parallel-serial coded input signals into the code of said counter-storage register circuits.

12. The combination defined in claim 11 and also including means for disabling said tape reader at the end of a predetermined information input sequence, and means for initiating the application of said pulse train to said counter-storage registers after said information input sequence has been completed, and means for enabling said tape reader at the end of said pulse train to initiate another information input sequence.

13. The combination defined in claim 12 wherein said parallel-serial coded output signals of said tape reader include a "start" signal which precedes a sequence of information input signals and an "end" signal which follows said information input signals and a "feed track" signal which accompanies each of said information input signals, and also including means for applying said "feed track" signals to said switching counter circuit in the time period between said "start" and "end" signals, thereby applying each of said information input signals to a corresponding one of said counter-storage register circuits.

14. A punched tape translator circuit comprising a tape reader adapted to produce parallel coded output signals in time sequence, each of said output signals including a feed track signal, a plurality of counter-storage register circuits, each of said counter-storage register circuits being adapted to receive input pulses and to step through a predetermined counting sequence in response to said input pulses in accordance with a predetermined code and to produce an output signal at a predetermined step of said counting sequence, and each of said storage registers being adapted ot receive parallel input signals and to be preset to a corresponding step of said counting sequence, an input switching matrix coupled between said counter-storage register circuits and said tape reader, an input switching counter coupled between said input switching matrix and said tape reader, a pulse-train generator circuit coupled to each of said counter-storage register circuits, means for activating said tape reader for a predetermined information input time period, and means for activating said pulse train generator in a predetermined information output time period following said information input time period.

15. The combination defined in claim 14 and also including a decoding matrix coupled between said counter-storage registers and said tape reader, said decoding matrix being adapted to translate said parallel coded output signals into the code of said counter-storage register circuits.

16. A code translator circuit for translating serial-coded signal units, each unit comprising parallel signal elements, into parallel-coded signal units, each unit comprising at least one serial-coded element, storage means comprising a plurality of storage circuits for storing said serial-coded signal units, the number of circuits being equal to the number of serial signal units, means to apply respective signal units to respective storage circuits, each storage circuit having parallel input means to receive said parallel signal elements of respective signal units, Translation means for simultaneously translating the contents of each of said storage circuits into serial coded elements to provide parallel-coded signal element.

References Cited by the Examiner

UNITED STATES PATENTS 2,905,930 9/1959 Golden ---------- 340—172.5

ROBERT C. BAILEY, *Primary Examiner.*

G. D. SHAW, *Assistant Examiner.*